(12) United States Patent
van't Erve et al.

(10) Patent No.: US 10,139,655 B2
(45) Date of Patent: Nov. 27, 2018

(54) METHOD FOR AN OPTICAL MODULATOR USING THE SPIN HALL EFFECT IN METALS

(71) Applicant: The United States of America, as represented by the Secretary of the Navy, Washington, DC (US)

(72) Inventors: Olaf M. J. van't Erve, Falls Church, VA (US); Connie H. Li, Alexandria, VA (US); Berend T. Jonker, Waldorf, MD (US); Aubrey T. Hanbicki, Washington, DC (US); Kathleen M. McCreary, Washington, DC (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 75 days.

(21) Appl. No.: 15/140,191

(22) Filed: Apr. 27, 2016

(65) Prior Publication Data

US 2016/0320641 A1    Nov. 3, 2016

Related U.S. Application Data

(60) Provisional application No. 62/155,220, filed on Apr. 30, 2015.

(51) Int. Cl.
*G02F 1/01* (2006.01)
*G02F 1/035* (2006.01)

(52) U.S. Cl.
CPC .......... *G02F 1/0136* (2013.01); *G02F 1/0353* (2013.01)

(58) Field of Classification Search
CPC ........ G02F 1/0136; G02F 1/0353; G02F 1/09; G02F 1/3511; G02F 1/0018; G02F 1/091; G02B 27/286; G02B 5/3083; G02B 6/126; G02B 27/26; G02B 6/105; G03F 7/70566; G01N 2201/067; G01N 21/21; G01N 2201/06113; G01N 2201/0683
See application file for complete search history.

(56) References Cited

U.S. PATENT DOCUMENTS

| 9,864,218 B2 * | 1/2018 | Wang | G02F 1/095 |
| 2012/0138887 A1 * | 6/2012 | Zhang | H01F 1/401 |
|  |  |  | 257/9 |

(Continued)

FOREIGN PATENT DOCUMENTS

| CN | 106018273 A | * 10/2016 | G01B 11/02 |
| CN | 107246844 A | * 10/2017 | G01B 11/06 |

OTHER PUBLICATIONS

Stern et al. ("Time-resolved dynamics of the spin Hall effect", Nature-Physics, Sep. 2008).*

(Continued)

*Primary Examiner* — Mohamed K Amara
(74) *Attorney, Agent, or Firm* — US Naval Research Laboratory; Roy Roberts

(57) ABSTRACT

The spin-Hall effect can be used to modulate the linear polarization of light via the magneto-optical Kerr effect. A material is illuminated while simultaneously passing a modulated electric current through the material, so that reflected light has a new linear polarization that differs from the initial linear polarization to a degree depending on the amplitude of the modulated electric current.

7 Claims, 4 Drawing Sheets

(56) References Cited

U.S. PATENT DOCUMENTS

| | | | | |
|---|---|---|---|---|
| 2012/0212375 | A1* | 8/2012 | Depree, IV | B82Y 10/00 |
| | | | | 343/700 MS |
| 2014/0252439 | A1* | 9/2014 | Guo | G11C 11/18 |
| | | | | 257/295 |
| 2016/0169988 | A1* | 6/2016 | Sirringhaus | G01R 33/1284 |
| | | | | 324/251 |
| 2016/0225982 | A1* | 8/2016 | Guo | H01L 43/08 |
| 2017/0104150 | A1* | 4/2017 | Shi | H01L 43/04 |
| 2017/0299904 | A1* | 10/2017 | Wang | G02F 1/095 |
| 2017/0301727 | A1* | 10/2017 | Lai | H01L 27/222 |
| 2017/0338021 | A1* | 11/2017 | Xiao | H01F 10/30 |

OTHER PUBLICATIONS

"Electrical detection of charge-current-induced spin polarization due to spin-momentum locking in Bi2Se3", Li et al. (2014) Nature nanotechnology.*
O. M. J. van 't Erve, A. T. Hanbicki, K. M. McCreary, C. H. Li, and B. T. Jonker, Optical detection of spin Hall effect in metals, Applied Physics Letters 104 (17) (2014).
J. E. Hirsch, Physical Review Letters 83 (9), 1834 (1999).
R. Shchelushkin and A. Brataas, Physical Review B 71 (4) (2005).
S. Zhang, Physical Review Letters 85 (2), 393 (2000).
T. Tanaka, H. Kontani, M. Naito, T. Naito, D. Hirashima, K. Yamada, and J. Inoue, Physical Review B 77 (16) (2008).
A. Hoffmann, Spin Hall Effects in Metals, Magnetics, IEEE Transactions on 49 (10), 5172 (2013).

* cited by examiner

METHOD FOR AN OPTICAL MODULATOR USING THE SPIN HALL EFFECT IN METALS

CROSS-REFERENCE TO RELATED APPLICATIONS

This Application claims the benefit of U.S. Provisional Application 62/155,220 filed on Apr. 30, 2015, the entirety of which is incorporated herein by reference.

BACKGROUND

Many optical experiments and optical based equipment require some form of modulation of the linear polarization of a light source. Variable modulators exist in three varieties.

The most widely used modulator is based on liquid crystals, with elongated molecules in a liquid oriented by an electric field. The retardation or rotation of a laser beam transmitted through this liquid crystal layer depends on this orientation and can thus be modulated by an electric field. Modulation can be done in the order of 0-10 kHz, for a narrow wavelength range.

Stress induced birefringence or the piezo-optic effect is used in photoelastic modulators, which can operate at high frequency (100 kHz) but also only for a narrow wavelength range.

A simpler approach involves the mechanical rotation of a fixed retarder. This allows only slow modulation, but for a large range of wavelength A need exists for a technique to modulate the linear polarization of a light source operable at high frequency (bandwidth) and over a broad range of wavelengths.

BRIEF SUMMARY

In one embodiment, a method of modulating the linear polarization of a light source includes illuminating a spin Hall material with a light source arriving from a propagation direction and having an initial linear polarization, such that reflected light is cast from an outer surface of the spin Hall material, while simultaneously passing a modulated electric current through the material in a direction perpendicular to the propagation direction, and receiving the reflected light to assess its linear polarization, wherein the reflected light has a new linear polarization that differs from the initial linear polarization to a degree depending on the amplitude of the modulated electric current, and wherein the spin Hall material is selected from the group consisting of W film, Ta film, Pt film, Bi doped Cu film, IrMn film, Hf doped Pt film, and multiple layers of these films.

In another embodiment, a method of modulating the linear polarization of a light source includes illuminating the outer surface of an added layer atop spin Hall material with a light source arriving from a propagation direction and having an initial linear polarization, such that reflected light is cast from the outer surface of the added layer, while simultaneously passing a modulated electric current through the material in a direction perpendicular to the propagation direction, and receiving the reflected light to assess its linear polarization, wherein the reflected light has a new linear polarization that differs from the initial linear polarization to a degree depending on the amplitude of the modulated electric current, wherein the spin Hall material is selected from the group consisting of W film, Ta film, Pt film, Bi doped Cu film, IrMn film, Hf doped Pt film, and multiple layers of these films, and wherein the added layer is a metal.

BRIEF DESCRIPTION OF THE DRAWINGS

FIG. 4A shows a schematic arrangement with a single layer of spin Hall material while FIG. 4B shows a schematic arrangement with the spin Hall material capped by an added layer.

DETAILED DESCRIPTION

Definitions

Figure 1:
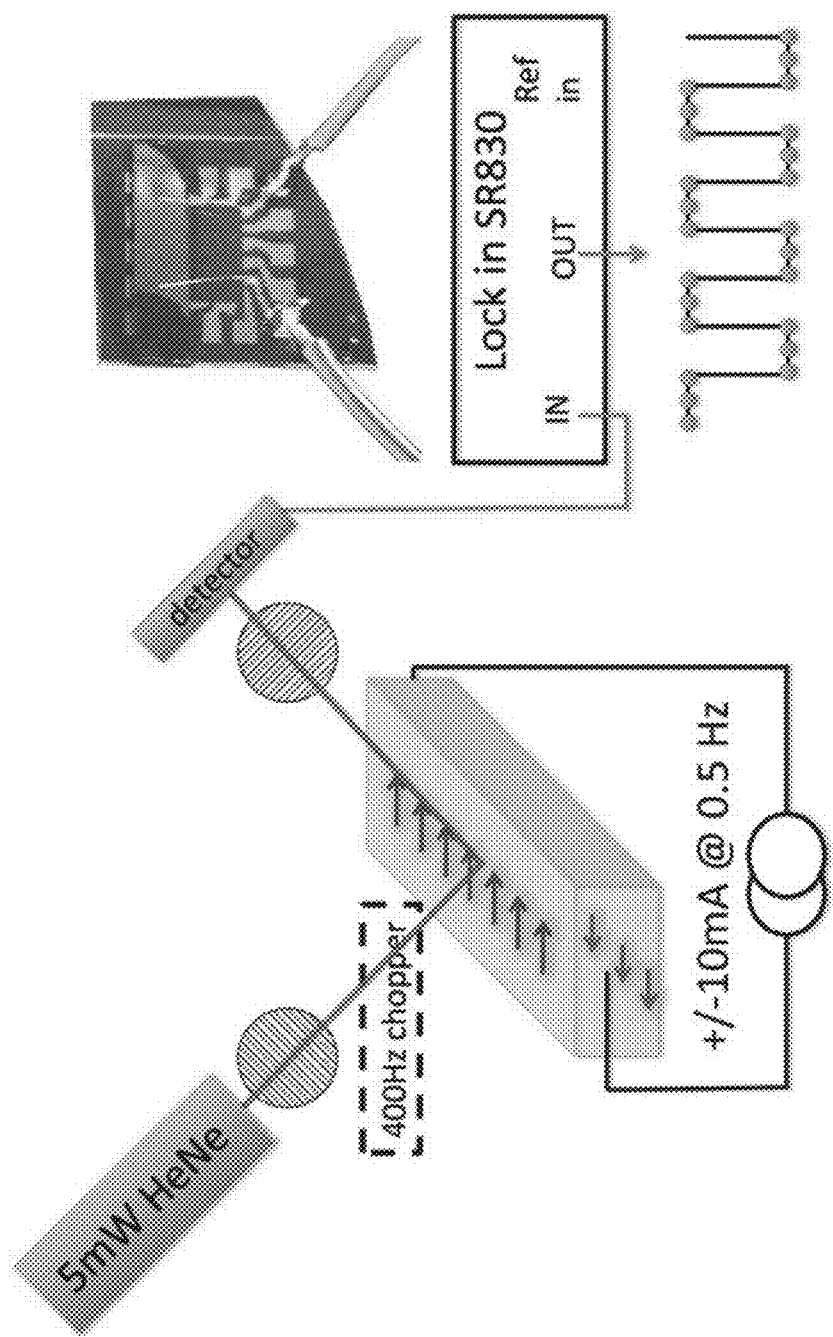
FIG. 1 is a schematic of the experimental setup utilizing the magneto-optical Kerr effect (MOKE). The sample is illuminated with linear polarized light from an unfocused 5 mW HeNe laser and linear polarizer. The light is modulated at 400 Hz by a rotating wheel style chopper, and is incident on the sample surface at 45°. The laser spot is ~1 mm across. The light reflected off the sample surface experiences a rotation in its linear polarization due to the magneto-optical Kerr effect, and this rotation is detected with a second linear polarizer followed by a silicon photodiode whose output is measured with a lock-in amplifier. The inset shows an image of sample mounted on a chip carrier with electrical connections wire-bonded directly to the film surface.

Before describing the present invention in detail, it is to be understood that the terminology used in the specification is for the purpose of describing particular embodiments, and is not necessarily intended to be limiting. Although many methods, structures and materials similar, modified, or equivalent to those described herein can be used in the practice of the present invention without undue experimentation, the preferred methods, structures and materials are described herein. In describing and claiming the present invention, the following terminology will be used in accordance with the definitions set out below.

As used in this specification and the appended claims, the singular forms "a", "an," and "the" do not preclude plural referents, unless the content clearly dictates otherwise.

As used herein, the term "and/or" includes any and all combinations of one or more of the associated listed items.

As used herein, the term "about" when used in conjunction with a stated numerical value or range denotes somewhat more or somewhat less than the stated value or range, to within a range of ±10% of that stated.

Overview

Describes herein is a process that uses thin films of beta-Tungsten to rotate the linear polarization of a laser beam after reflection of its surface (see ref. 1 describing this work of the inventors, not prior art). The amount and direction of the rotation can be controlled by the current flowing through the metal film. This a much faster technique for a broader range of wavelengths compared to existing LCD or photoelastic based modulators. Furthermore, one can arbitrarily increase the output modulation by multiple bounces of the metal surface.

This technique to rotate the linear polarization involves the magneto-optical Kerr effect (MOKE), with rotation caused by reflecting a laser beam of a magnetized surface. MOKE is commonly used to study the surface magnetization of magnetic materials. In some metals, those with a large spin Hall angle, electrons with spin up are scattered in one direction and electrons with spin down are scattered in the other direction, analogues to the Hall effect. This leads to a spin accumulation at the surface of a thin film. This spin accumulation will rotate a reflected linearly polarized laser beam, as would a magnetic material in a magneto optical Kerr effect arrangement.

As described below, the spin Hall effect can create a large enough spin accumulation at the surface of a non-magnetic metal to rotate the polarization of the reflected light as desired. Since reflecting of a metal surface is possible for a large range of wavelengths and the spin accumulation is governed by spin lifetimes, this method can modulate at high frequencies (up to and beyond 100 GHz) for a large range of wavelengths.

The spin Hall effect (SHE) (see ref. 2) is the generation of a pure spin current transverse to an applied charge current as a consequence of the spin-orbit interaction. Electrons of opposite spin are scattered in opposite directions, resulting in a spin accumulation at the surface perpendicular to the charge current. The spin Hall effect can be described by the spin Hall angle $\theta_{SH}=J_S/J_e$ (see refs. 3 and 4) where $J_S$ and $J_e$ are the spin and charge current densities, respectively, and $0<|\theta_{SH}|\leq 1$. Large spin Hall angles have recently been predicted (see ref. 5) and experimentally confirmed in nonmagnetic metals with large spin-orbit coupling. The high-resistivity β-phase of Ta and W are two such metals that exhibit large spin hall angles. Because spin and charge are separated, one can define different cross sections for spin and charge current, following ref. 6 this leads to $I^S/I^C=l/t\ \theta_{SH}$, where $I^S$ and $I^C$ are the spin and charge current respectively, t is the film thickness and l is the detection width.

If a current-carrying metal film with a large spin Hall angle is illuminated with linear polarized light from a laser, than the light reflected off the sample surface experiences a rotation in its linear polarization due to the magneto-optical Kerr effect. The amount of rotation depends on the spin accumulation at the metal surface, which in turn is controlled by the current through the metal film.

Description and Operation

Thin films of W on $SiO_2$ substrates were prepared by sputtering using a 25 W DC plasma in a 3 mTorr Ar atmosphere at room temperature. The crystallographic structure of tungsten strongly impacts the spin Hall angle as well as the resistivity, ρ. The metastable β-phase has a relatively high ρ and large spin Hall angle (>0.33), while the more thermodynamically stable-phase exhibits a lower ρ and small spin hall angle (<0.07). The resistivity of the as-deposited W thin films (80 Å) is 200 μΩ-cm, consistent with the β-phase. After a 30 min anneal at 300° C. in vacuum, the resistivity decreases to 30 μΩ-cm, indicating a transformation to the more thermodynamically stable α-phase. Al thin films (200 Å) are deposited by electron-beam evaporation on $SiO_2$ substrates as a reference sample. Electrical contacts to these samples are achieved by simply wire bonding directly to the film surface at opposite ends of a 2 mm×5 mm piece of the sample. No lithography or processing was performed.

FIG. 1 schematically illustrates experimental setup. The sample is illuminated with linear polarized light from an unfocused 5 mW HeNe laser and linear polarizer. The light is modulated at 400 Hz by a rotating wheel style chopper, and is incident on the sample surface at 45°. The laser spot is ~1 mm across. The light reflected off the sample surface experiences a rotation in its linear polarization due to the magneto-optical Kerr effect, and this rotation is detected with a second linear polarizer followed by a silicon photo-diode whose output is measured with a lock-in amplifier, Stanford Research Systems model SR830.

Figure 2:
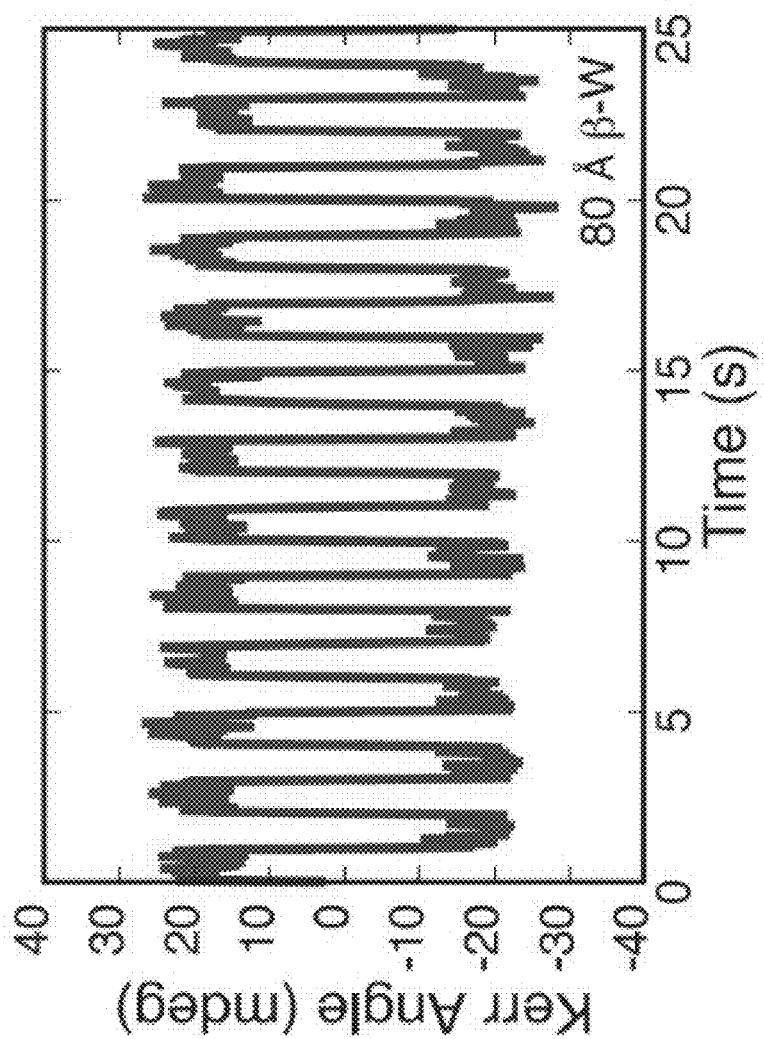
FIG. 2 shows the results obtained via the lock-in-amplifier measurement of the setup described for FIG. 1.

The Kerr response of a non-magnetic, high-resistivity, 80 Å thick β-W film is shown in FIG. 2 with a square wave current of +/−10 mA modulated at 0.5 Hz is applied in the plane of the film perpendicular to the propagation direction of the laser light as described above for FIG. 1. In this case, no external magnetic field is used. The reflected light was sampled at 20 Hz for a period of 200 seconds. The output of the lock-in amplifier shown in FIG. 2 exhibits a clear square wave at 0.5 Hz. This demonstrates that due to the net spin polarization generated in the β-W film by the spin-Hall effect a rotation of 20 mdeg is observed in the reflected light.

Several considerations indicate that the measured response truly reflects the spin-Hall effect and is not a spurious result. First, the laser is interrupted at a frequency (400 Hz) that differs significantly from the applied +/10 mA reversal at 0.5 Hz, in order to eliminate electrical cross talk. Second, the electro-optical Kerr effect, where the rotation of the polarization is caused by an electric field across the sample, can be ruled out. Even though a very small electric field is present between the contacts on the metallic β-W film, the electro-optical Kerr response is proportional to the square of the applied electric field, and thus the signal should not change sign when the sign of the field is reversed. Third, a magneto-optical Kerr effect is produced when a paramagnetic material is placed in a magnetic field. In principle, the magnetic field generated by the bias current could cause such an effect. However, the maximum field from a 10 mA current through a 2 mm wide 80 Å film is 0.2 Oe. Also no signal was observed, when an unbiased sample is placed in an external magnetic field (±100 Oe), so this contribution can be ruled out. No signal was observed for an Al reference sample, and none is expected due to the small spin Hall angle (0.0002) of Al.

Figure 3:
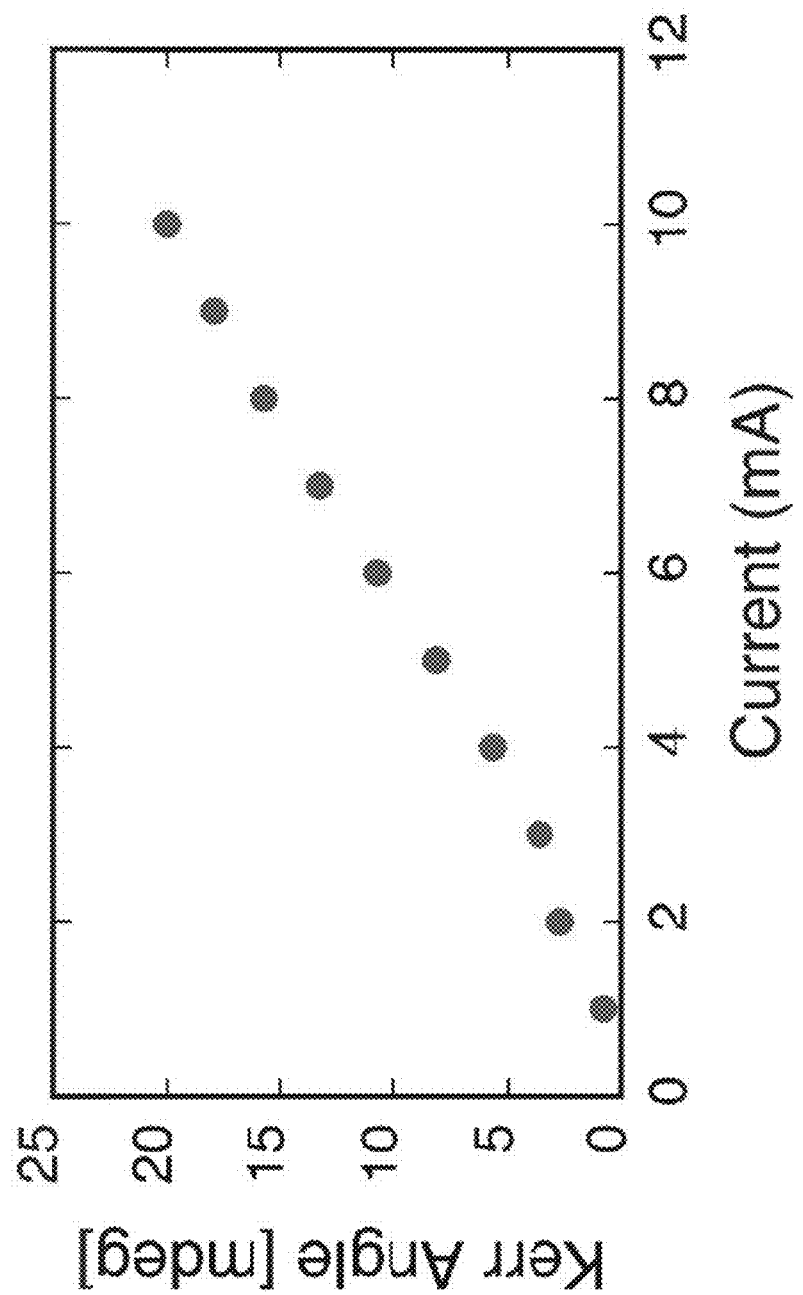
FIG. 3 shows that the Kerr angle change in the reflected light varies with bias current.

Additional experiments with varied parameters such as the frequency, angle between the incident laser light and the applied bias current, and magnitude of the current further verify that the observed signal is indeed produced by the spin Hall effect. Spin accumulation arising from SHE and thus the degree of rotation is expected to increase with increasing bias current. To probe the bias dependent behavior of the 80 Å β-W metal films, the Kerr rotation was measured under applied current of +/−1 to +/−10 mA (0.5 Hz square wave). The geometry is again such that the current is perpendicular to the propagation of the light. The Kerr angle depends almost linearly on the bias current as seen in FIG. 3.

Suitable spin Hall materials can include W film, Ta film, Pt film, Bi doped Cu film, IrMn film, Hf doped Pt film, and multiple layers of combinations such films. Multiple layers are expected to increase the spin Hall effect. A layer can have a thickness of between 10 Å and 500 Å. Preferably, the spin Hall material has a large spin Hall angle (that is, at least 0.01).

Although the example used a square-wave modulated electric current of +/−10 mA, plainly variations are possible. The current might range from +/−1 mA to 1 Ampere, for example from +/−100 mA. The waveform could be square, modified square wave, sinsusoidal, other known waveforms. Modulation frequency into the GHz range could be employed.

Figures 4A, 4B:
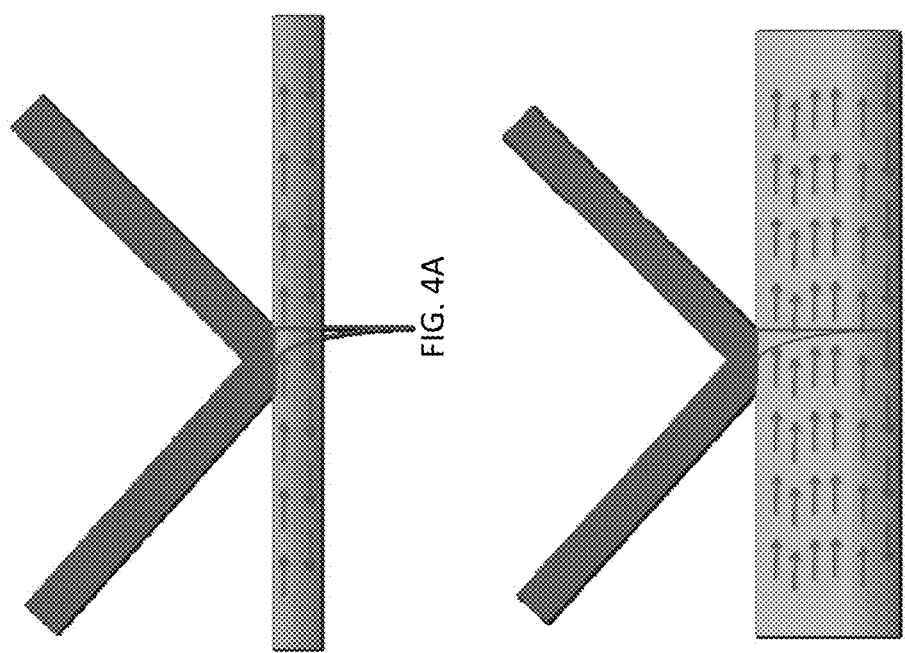

Also contemplated are embodiments wherein the spin Hall material is capped by an added layer atop the spin Hall from which the light is reflected, as seen in FIG. 4B. The added layer can enhance the degree of rotation of the linear polarization of the reflected light The added layer comprises a metal and is preferably a good reflector. The spin current from the spin Hall effect of the bottom layer creates spin accumulation in the added layer. In embodiments, the added layer is a good spin diffuser. Particular embodiments feature an added layer with a thickness of about the same as the thickness of the spin Hall material or thicker, but not thicker than 5 times the spin diffusion length of said material (i.e., the added layer can have a thickness of between 10 Å and 5000 Å). Films of Au and/or Al might serve as added layers. For example, addition of an added Al layer improved the signal from a tungsten spin Hall material by a factor of five. In additional embodiments, the added layer is accompanied by a dielectric layer between it and the spin Hall layer, functioning to separate the charge current from the spin current.

Further embodiments include multiple reflections to enhance the degree of rotation of the linear polarization of the reflected light. These embodiments can optionally include dozens of additional reflections. The spin Hall material involved in each reflection can be the same or different and subject to the same or different modulation.

Advantages and New Features

This technique works for a broad range of wavelengths Unlike the alternatives, this method works by reflecting of a metal surface, which like a mirror, is a very broad wavelength effect.

Modulation from very low to very high frequency is possible. Modulation is due to spin accumulation by the spin-Hall effect, which works as a steady state effect but can also be switched. The example shown above in FIG. 2 was modulated at 0.5 Hz. The spin accumulation occurs at the time scale of the electron scatter rates and spin life times, which both are in the ps second regime, thus modulation well in the GHz regime should be possible.

The amount of rotation can be easily boosted to an arbitrarily large number by designing an optical path that includes multiple bounces of the current carrying metal with the large spin Hall angle. Each additional bounce would add to the rotation of the linear light.

Applications

This simple and cost-effective method combined with modest sample preparation enables future optical studies of the spin Hall effect in metals using a variety of spatial imaging and spin dynamics experiments, further enhancing spintronic devices that use the spin Hall effect.

It is expected that this technique could allow for multi-wavelength optical computing using a single electro-optical modulator, improved remote sensing techniques, and/or improved optical isolators.

CONCLUDING REMARKS

All documents mentioned herein are hereby incorporated by reference for the purpose of disclosing and describing the particular materials and methodologies for which the document was cited.

Although the present invention has been described in connection with preferred embodiments thereof, it will be appreciated by those skilled in the art that additions, deletions, modifications, and substitutions not specifically described may be made without departing from the spirit and scope of the invention. Terminology used herein should not be construed as being "means-plus-function" language unless the term "means" is expressly used in association therewith.

REFERENCES

1. O. M. J. van 't Erve, A. T. Hanbicki, K. M. McCreary, C. H. Li, and B. T. Jonker, "Optical detection of spin Hall effect in metals," Applied Physics Letters 104 (17) (2014).
2. J. E. Hirsch, Physical Review Letters 83 (9), 1834 (1999).
3. R. Shchelushkin and A. Brataas, Physical Review B 71 (4) (2005).
4. S. Zhang, Physical Review Letters 85 (2), 393 (2000).
5. T. Tanaka, H. Kontani, M. Naito, T. Naito, D. Hirashima, K. Yamada, and J. Inoue, Physical Review B 77 (16) (2008).
6. A. Hoffmann, Spin Hall Effects in Metals, Magnetics, IEEE Transactions on 49 (10), 5172 (2013).

What is claimed is:

1. A method of modulating the linear polarization of a light source, comprising:
   illuminating a central area of a spin Hall material with a light source to produce light arriving at the spin Hall material from a propagation direction that is not orthogonal to a plane of the spin Hall material and having an initial linear polarization, such that reflected light is cast from an outer surface of the spin Hall material, while simultaneously passing a modulated electric current through the spin Hall material in a direction perpendicular to the propagation direction, and
   receiving the reflected light to assess its linear polarization,
   wherein the reflected light has a new linear polarization that differs from the initial linear polarization to a degree depending on the amplitude of the modulated electric current, and
   wherein the spin Hall material is selected from the group consisting of W film, Ta film, Pt film, Bi doped Cu film, IrMn film, Hf doped Pt film, and multiple layers of these films.

2. The method of claim 1, wherein said receiving comprises receiving through a linear polarizer followed by a silicon photodiode having an output operably connected to a lock-in amplifier.

3. The method of claim 1, wherein said spin Hall material comprises the W film, and more particularly comprises a β-phase tungsten film.

4. The method of claim 1, wherein said spin Hall material has a spin Hall angle of at least 0.01.

5. The method of claim 1, further comprising causing the reflected light to arrive at a surface of at least a second spin Hall material and to reflect therefrom prior to said receiving.

6. The method of claim 5, further comprising causing the reflected light to arrive at a surface of at least a third spin Hall material and to reflect therefrom prior to said receiving.

7. The method of claim 1, wherein the amplitude of the modulated electric current is within +/−100 mA.

* * * * *